United States Patent [19]
Ito

[11] Patent Number: 5,791,314
[45] Date of Patent: Aug. 11, 1998

[54] ENGINE CONTROL SYSTEM AND METHOD

[75] Inventor: Takeshi Ito, Iwata, Japan

[73] Assignee: Yamaha Hatsudoki Kabushiki Kaisha, Iwata, Japan

[21] Appl. No.: 763,859

[22] Filed: Dec. 11, 1996

[30] Foreign Application Priority Data

Dec. 18, 1995 [JP] Japan .................. 7-348335

[51] Int. Cl.$^6$ .................. F02M 7/00
[52] U.S. Cl. .................. 123/436
[58] Field of Search .................. 123/436, 673, 123/419

[56] References Cited

U.S. PATENT DOCUMENTS

| | | | |
|---|---|---|---|
| 4,434,768 | 3/1984 | Ninomiya | 123/436 |
| 5,086,741 | 2/1992 | Nakamura et al. | 123/436 |
| 5,275,142 | 1/1994 | Kapellen et al. | 123/436 |
| 5,515,828 | 5/1996 | Cook et al. | 123/436 |
| 5,604,132 | 2/1997 | Hori et al. | 123/436 |

*Primary Examiner*—Thomas N. Moulis
*Attorney, Agent, or Firm*—Knobbe, Martens, Olson & Bear LLP

[57] ABSTRACT

An improved feedback control system for an engine that employs only a single sensor associated with only one cylinder of the engine. Cylinder-to-cylinder adjustments are made based upon measurement of the differences in crankshaft speed during a portion of the compression stroke for each cylinder so as to provide an accurate indication of air flow to the individual cylinders.

20 Claims, 6 Drawing Sheets

Fluctuation in Speed Ratio In Relation to Cyl #2

Fig. (A)

Variation in RPM of Shaft

Fig. (B)

Variation in Shaft Speed

Fig. (C)

Variation in Shaft Speed

Fig. (D)

Variation in Shaft Speed

ENGINE CONTROL SYSTEM AND METHOD

BACKGROUND OF THE INVENTION

This invention relates to an engine control system and method and, more particularly, to an improved system and method employing an air/fuel ratio sensor and feedback control arrangement.

In order to improve the performance of an engine, not only the power and driveability but also the fuel economy and exhaust emission control, a wide variety of types of control systems and methods have been employed. One of the more successful types of systems utilized is the so-called "feedback control" type of system.

These systems employ a sensor or sensors which sense the actual air/fuel ratio in the combustion chamber or chambers of the engine. One type of sensor frequently utilized for this purpose is an oxygen ($O_2$) sensor. The $O_2$ sensor is positioned in either the combustion chamber, exhaust port or exhaust system and senses the amount of residual oxygen in the burnt charge. By determining the amount of oxygen present, it is possible to measure the actual air/fuel ratio that was burned in the combustion chamber.

These systems operate by setting a target air/fuel ratio and then comparing the actual air/fuel ratio with that target ratio. Adjustments are then made in the air and/or fuel charging systems to bring the air/fuel ratio to the desired ratio. Obviously, these types of systems offer great potential.

It should be apparent that the precise location of the sensor is important in obtaining good performance. The sensor should be in a position where it will generally sense only the combustion products before they have been mixed with a fresh incoming charge. Furthermore, these sensors tend to be quite expensive and, thus, it is desirable to provide an arrangement wherein it is not necessary to utilize and position a sensor for each combustion chamber of the engine.

It is possible to provide an arrangement wherein only one sensor is employed for multiple cylinders. This can be done in one of two ways. In one way, the sensor is positioned so as to read an average output from all cylinders of the engine. This has several disadvantages. First, the sensor must be positioned relatively remotely from the combustion chambers so as to sense the combustion products from all of them. This introduces the likelihood of mixing and erratic and non-representative results.

Another type of system that minimizes the number of sensors uses a sensor positioned at the optimum position for one cylinder. The performance of other cylinders is then approximated from the readings of this one cylinder. This type of system also has some disadvantages.

Specifically, where only the performance of one cylinder is measured, it may be difficult, if not impossible, to relate the effects of that one cylinder on the performance of other cylinders. That is, even if the engine is designed in such a way to obtain substantial uniformity in the intake and exhaust systems for the individual cylinders, it is difficult to obtain equal results for all cylinders. That is, the configuration of the intake and exhaust systems, which generally employ common portions, make it difficult to ensure that all cylinders are served equally.

Furthermore, the variations from cylinder-to-cylinder will vary under a wide variety of running conditions. In fact, the performance of one cylinder can affect the charging and exhaust of another cylinder.

It is, therefore, a principal object of this invention to provide an improved method and system for controlling an engine utilizing a feedback control system.

It is a further object of this invention to provide an improved feedback control system for an engine wherein the adjustments are made by sensing other factors in addition to air/fuel ratio but which may effect the air/fuel ratio.

It is a further object of this invention to provide an improved method and system for operating an engine of multiple cylinders and wherein only a single sensor need be employed for controlling multiple cylinders.

SUMMARY OF THE INVENTION

This invention is adapted to be embodied in a control system and method for internal combustion engine that has a combustion chamber. An air/fuel charging system is supplied for supplying an air/fuel charge to the combustion chamber. An exhaust system is also provided for discharging the exhaust gases from the combustion chamber to the atmosphere. An engine output shaft is driven by the combustion which occurs in the combustion chamber. A combustion condition sensor is provided for sensing the air/fuel ratio in the combustion chamber. A feedback control is provided for controlling the air/fuel charging system to vary the air/fuel ratio depending upon the output of the combustion condition sensor.

In accordance with a system for practicing the invention, a sensor is also provided for sensing variations in engine output shaft rotational speed for less than one complete revolution. The feedback control system is then adjusted in response to speed variations to compensate for variations in the engine which will effect the air/fuel ratio.

In accordance with a method for practicing the invention, deviations in the rotational speed of the engine output shaft for less than one complete revolution are measured. From these measurements, adjustments are made in the feedback control system so as to accommodate for variations in engine performance that will effect the air/fuel ratio.

DETAILED DESCRIPTION OF THE PREFERRED EMBODIMENTS OF THE INVENTION

Figure 1:
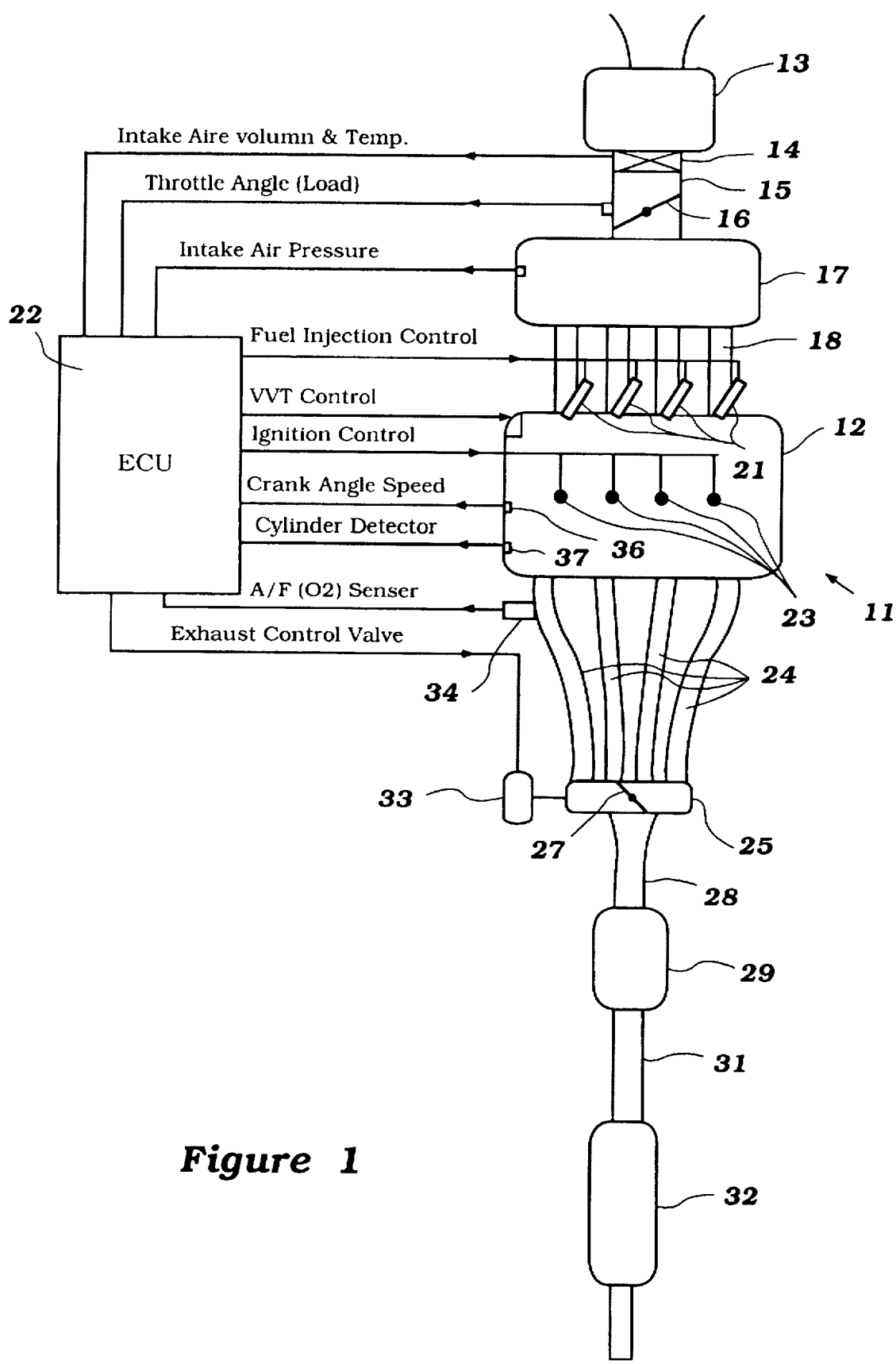
FIG. 1 is a top plan and partially schematic view of an internal combustion engine having a control system and methodology constructed in accordance with an embodiment of the invention.

Referring now in detail to the drawings and initially to FIG. 1, an internal combustion engine and control system constructed and operated in accordance with an embodiment of the invention is indicated generally by the reference numeral 11. Since the invention deals primarily with the control system and methodology and not with specific details of the construction of the engine 11, it is illustrated generally schematically.

In the illustrated embodiment, the engine 11 is comprised of a cylinder block/cylinder head assembly 12 that forms four in-line cylinder bores. Obviously, those skilled in the art will readily understand from the following description how the invention can be utilized with engines having other cylinder numbers and other cylinder configurations. The invention, however, has particular utility in conjunction with multiple cylinder engines. The cylinder bores of the cylinder block/cylinder head assembly reciprocally support pistons that are connected by means of connecting rods to drive an engine crankshaft or output shaft in well-known manner.

The engine 11 is provided with an induction system which includes an air inlet device 13 in which an air filter 14 is mounted. The inlet device serves a throttle body 15 in which a manually operated throttle valve 16 is positioned.

The throttle body 15 communicates with a plenum chamber or surge tank 17 from which a plurality of manifold runners 18 extend. These manifold runners 18 each serve intake ports formed in the cylinder block/cylinder head assembly 12 for delivering the intake charge to the engine combustion chambers. The engine may be provided with one or multiple intake valves per cylinder.

Preferably, the intake valves are operated by an overhead camshaft that is driven at one-half crankshaft speed by a suitable timing drive. This timing drive includes a variable valve timing mechanism (VVT), shown schematically at 19 which operates so as to vary the timing and/or duration of intake valve opening relative to crank angle.

The air charging system is augmented by a fuel charging system which, in the illustrated embodiment, comprises a plurality of manifold-type fuel injectors 21 which inject fuel into either the manifold runners 18 or the intake ports of the cylinder block/cylinder head assembly 12. The timing and duration of fuel injection is controlled by an ECU shown schematically at 22 and which operates in accordance with a control strategy which will be described. Basically, this control strategy permits the timing and duration of injection from each of the injectors 21 to be controlled independently of the others. This is done, as will become apparent, to maintain the desired air/fuel ratio.

Spark plugs 23 are mounted in the cylinder head portion of the cylinder block/cylinder head assembly 12 and are fired by a suitable ignition system. Like the fuel injection of the fuel injectors 21, the timing of firing of the spark plugs 23 is controlled by the ECU 22.

The charge which has been ignited in the combustion chambers by the spark plugs 23 will burn and expand and drive the pistons in the cylinder bores downwardly so as to drive the crankshaft of the engine in a known manner. The burnt charge is discharged through an exhaust system which includes exhaust ports formed in the individual cylinder bores and the flow through which is controlled by exhaust valves. The engine 11 may be provided with either one or more exhaust ports and exhaust valves per cylinder. Like the intake valves, the exhaust valves are operated by an overhead mounted camshaft in a know manner.

This camshaft may be driven by the same drive as the intake camshaft and may also include a variable valve timing mechanism. The variable valve timing mechanism employed can be utilized with either the intake and/or exhaust valve to obtain the desired engine performance.

Figure 2:
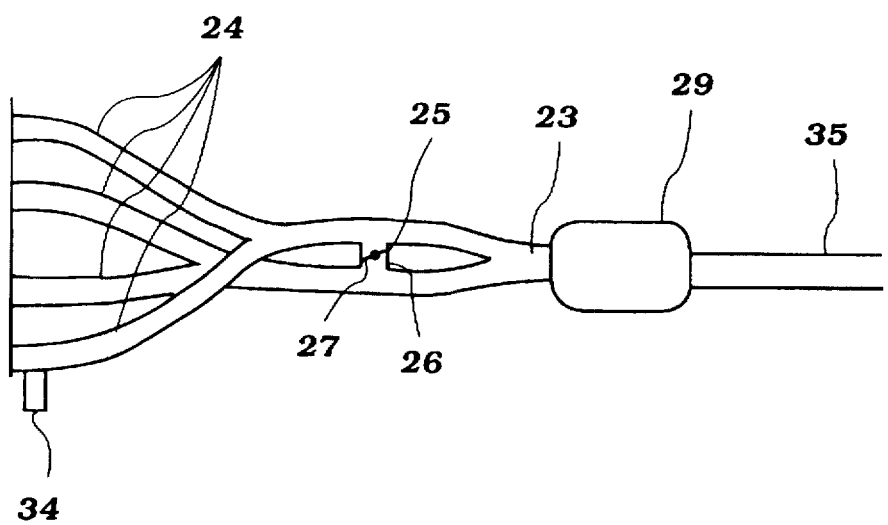
FIG. 2 is a top plan view showing in more detail a portion of the exhaust system and the exhaust control valve.

The exhaust ports in the cylinder block/cylinder head assembly 12 communicate with exhaust manifold runner sections 24 which, in turn, communicate with a control valve assembly 25 as seen also in FIG. 2. The arrangement is such that the runners 24 are paired with a cross-over passage 26 extending between the pairs. This cross-over passage 26 is controlled by a butterfly-type exhaust control valve 27. By opening or closing the exhaust control valve 27, it is possible to communicate the exhaust ports with each other so as to vary the back pressure and provide in effect exhaust tuning.

Downstream of the control valve 25 and bypass passage 26, the exhaust pipes merge into a common exhaust pipe 28 which, in turn, communicates with a catalytic converter 29. A three-way catalyst is provided in this catalytic converter 29 for treating the exhaust gases. From the catalytic converter 29, the exhaust gases delivered through a tail pipe 31 to a muffler or other silencing device 32 and then to the atmosphere.

The exhaust control valve 27 is controlled by a servo motor 33 which is, in turn, controlled by the ECU 22 to provide a control strategy which will be described in part later. Except for the portion which will be described, any suitable type of control strategy may be employed for the exhaust control valve servo motor 33.

As has been noted, the construction of the engine 11 has been described only generally and those skilled in the art will readily understand how to apply the invention in conjunction with any of a wide variety of types of engines. For this reason, further details of the construction of the engine 11, except for its control strategy and the sensors associated with it, are not believed to be necessary to permit those skilled in the art to practice the invention.

Basically, the ECU 22 operates on a feedback control system that includes an oxygen or air/fuel ratio sensor, shown schematically at 34 and which is placed in one of the exhaust manifold runners 24 in close proximity to the exhaust port served. In the illustrated embodiment, the sensor 34 is placed in the runner 24 associated with the number 1 cylinder, numbering the cylinders from left to right as seen in FIG. 1.

In addition to the output of the sensor 34 to the ECU 22, additional sensors are provided for engine control. These may include a throttle position or load sensor 35 that is associated with the throttle body 15 and which provides a signal indicative of the position on the throttle valve 16. Also, a crank angle sensor 36 is associated with the engine crankshaft and outputs a signal that is indicative of the angle of the crankshaft and, by comparison of the angle with time, the speed of the rotation of the crankshaft. This speed signal can be utilized to provide not only an average speed signal, but also an instantaneous speed signal over a finite degree of rotation of the crankshaft. This will be described later.

In addition, there is provided a cylinder detector 37 which indicates which of the cylinders is at top dead center position or when a specific one of the cylinders is at that position.

The intake air pressure in the plenum chamber 17 is sensed by a sensor 38 and this information is also transmitted to the ECU 22.

In accordance with the invention, the control for the cylinders which are not directly associated with the oxygen sensor 34 is done based upon a factor which includes a factor that varies in relationship to the instantaneous difference in crankshaft speed over a certain range of operation. As has been noted, the air/fuel ratio is controlled basically by changing the amount of fuel which is injected. However, the systems of the prior art operate on the assumption that the intake air volume is either the same for all cylinders or differs only in a fixed variable.

However, it has been discovered that the intake air volume varies from cylinder-to-cylinder in a nonlinear fashion. Thus, an arrangement is provided for making an adjustment for the variation in intake air volume from cylinder-to-cylinder so that, when the fuel amount is changed, the actual fuel ratio can be more accurately controlled.

Figure 4:
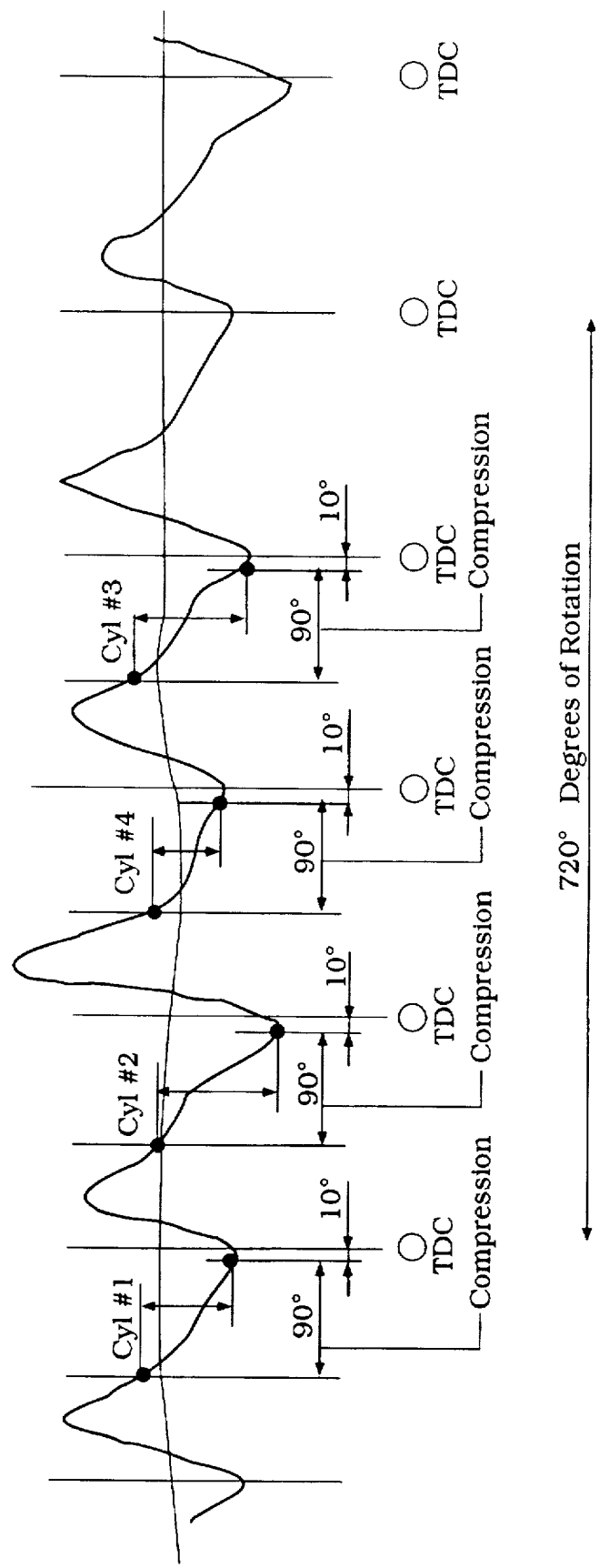
FIG. 4 is a graphical view showing how the engine speed varies, both from cylinder-to-cylinder and during a single revolution, and also depicts the measurement period utilized in accordance with the invention.

In accordance with the invention, it is possible to determine the actual intake air volume by measuring the speed of the crankshaft at two different crank angles and then computing the intake air volume from this speed difference. As may be seen in FIG. 4, the instantaneous rotational speed of the crankshaft varies during a single rotation of the crankshaft or during several rotations. FIG. 4 shows the rotation through 720° or two complete rotations.

Figure 3:
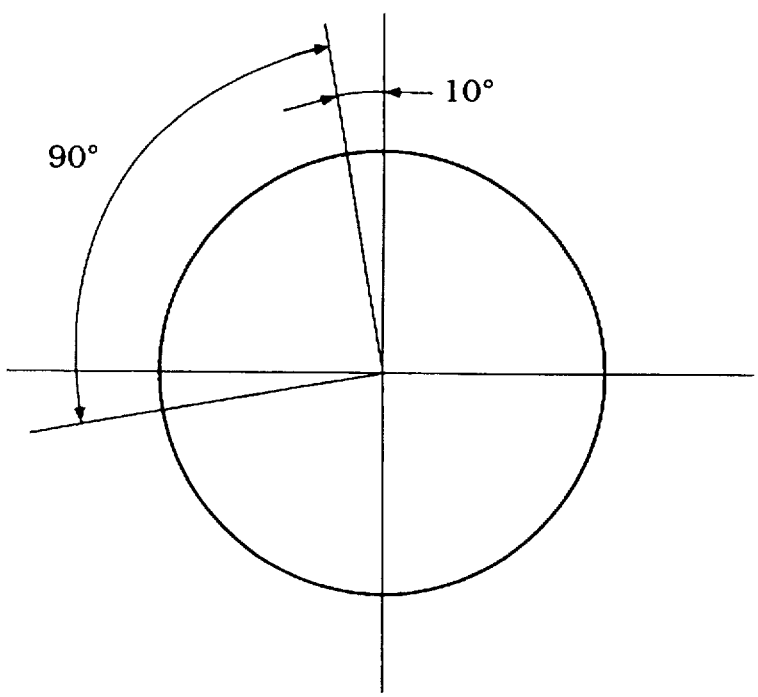
FIG. 3 is a timing diagram showing the crank angle of the engine output shaft so as to indicate the particular crank angle range during which speed variation are measured.

It has been found that by measuring the in-cylinder pressures through an in-cylinder pressure sensor during the compression stroke at certain crank angles, the intake air volume can accurately predicted. The angular measurement is chosen so as to begin sometime after bottom dead center and preferably before the piston travels half of its stroke in the compression cycle. Another reading is taken after a further 90° of crankshaft rotation. This final reading is taking at 10° before top dead center as seen in FIGS. 3 and 4. By taking the final reading at this point in time, it will be ensured that the combustion process which begins after firing of the spark plugs 23 will not effect the instantaneous speeds. Therefore, the first reading is taken at approximately 260° of crank angle and the final reading is taken at 350° of crank angle and the speed differences measured.

Figure 5:
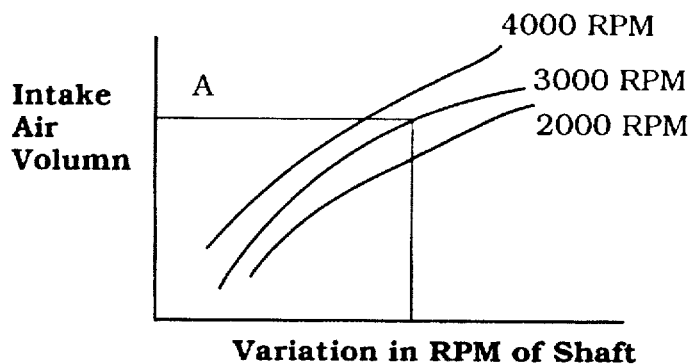
FIG. 5 is a series of graphical views showing the variation in instantaneous crank angle speed associated with each cylinder at varying engine speeds and shows how the intake air volume varies in accordance with such speed variations.
Figure 5:
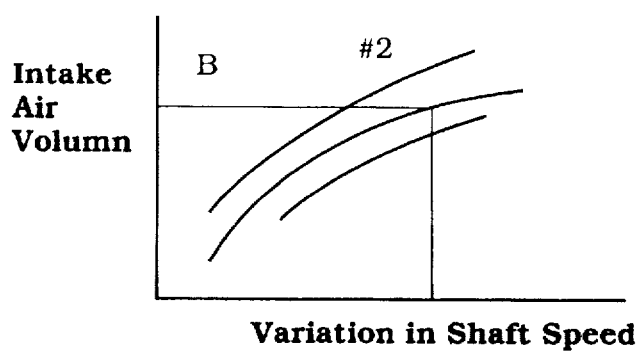
Figure 5:
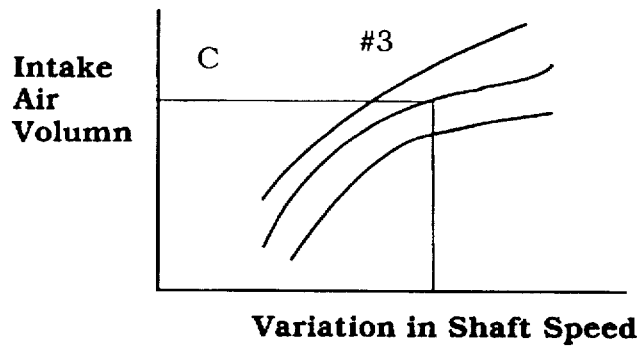
Figure 5:
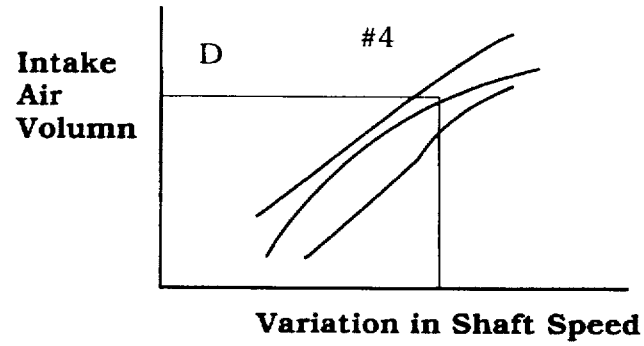
Figure 6:
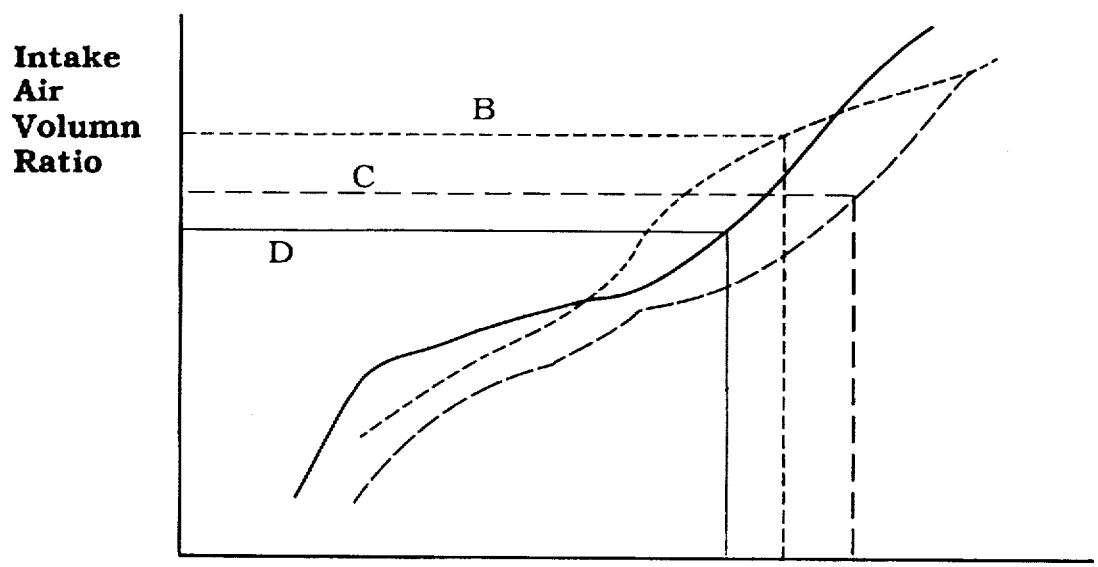
FIG. 6 is a graphical view, in part similar to those of FIG. 5 and shows the variation of cylinder-to-cylinder from the measured cylinder under the same conditions.

As may be seen in FIG. 5, at different engine speeds there is a difference in intake air volume for a given variation in engine speed during a given cycle. Also, it will be seen that the curves for each cylinder are different. Therefore, a ratio map is established as shown in FIG. 6 which can be utilized to determine corrective factors in speed ratio so as to measure the actual air that has been inducted in the cylinder and then the fuel amount can be varied in order to provide the feedback control amount required in order to balance the cylinders and provide the desired air/fuel ratio in each cylinder.

Figure 7:
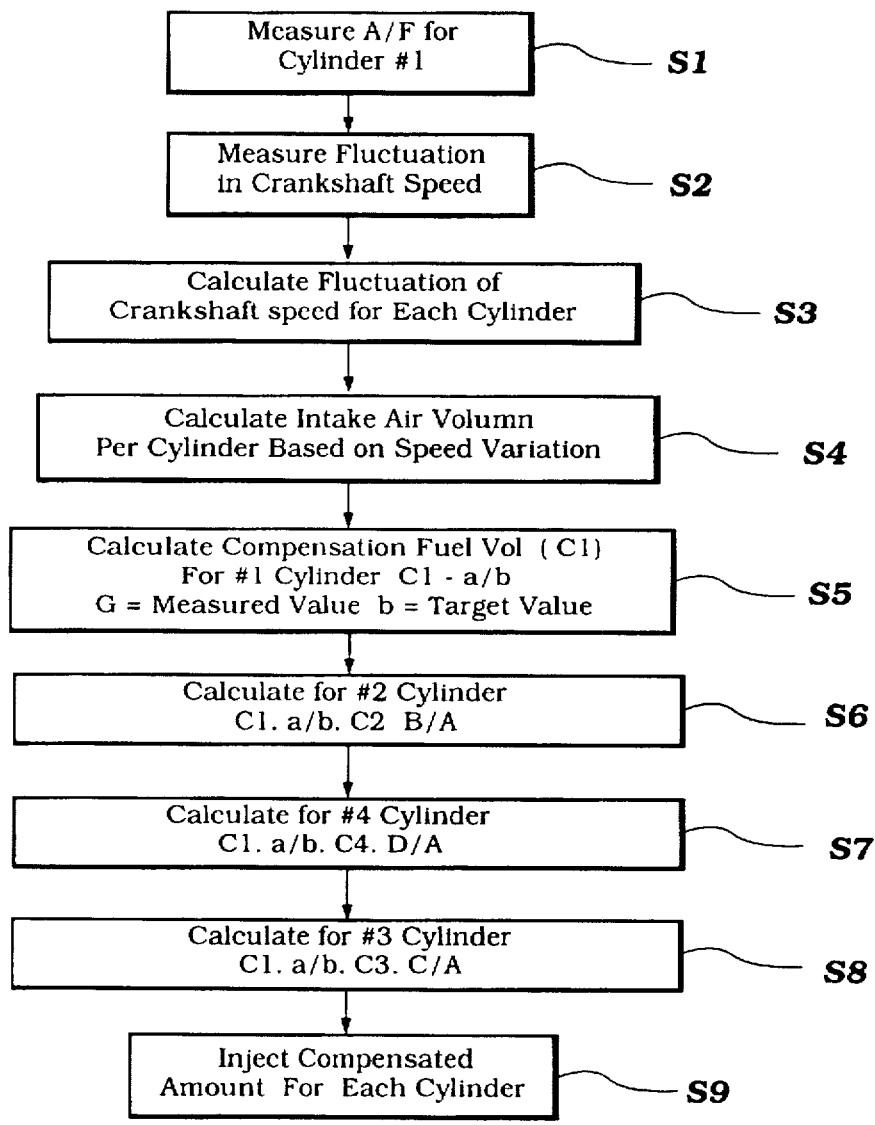
FIG. 7 is a block diagram showing the control routine in accordance with the invention.

The control routine by which this accomplished is illustrated in FIG. 7 and will now be described by reference to that figure. As seen in this figure, the program begins at the step S1 to measure the air/fuel ratio for cylinder 1 utilizing the $O_2$ 34. The program then moves to the step S2 so as to measure the speed difference in cylinder 1 of the crankshaft at the 90° intervals previously mentioned.

The program then moves to the step S3 so as to calculate the fluctuations in speed for each remaining cylinder utilizing the same 90° intervals, but for the respective cylinders.

Having thus determined the instantaneous speed variations for each cylinder, it is possible at the step S4 to calculate the actual intake air volume per cylinder. This is done based upon experimental data obtained by utilizing curves, such as those shown in FIG. 5.

The program then moves through the steps S5, S6, S7 and S8 so as to calculate the incremental compensation which should be made for the fuel injection in each of the subsequently firing cylinders (2, 4 and 3).

Turning first to cylinder number one, the correction factor C1 is based upon a constant the ratio of the measured value a to the target value b.

The compensation values for the remaining cylinders are calculated on the basis of their firing order and, in the specific example shown, the firing order for the cylinders is one- two- four- three. Hence, the compensation volume for the number two cylinder is calculated by taking the compensation volume for the number one cylinder and multiplying it by the compensation constant C2 for this cylinder and by the ratio of the value B divided by the value A determined from a map like the map of FIG. 5. In a like manner, that for the remaining cylinders is calculated based upon the same equations.

Then, at the step S9, the compensated amount of fuel is injected for each cylinder for the next cycle. Also, the control system may be designed so as to operate either or both of the exhaust control valve 27 or the variable valve timing mechanism 19 so as to try to minimize cylinder-to-cylinder variations.

Thus, it should be readily apparent from the foregoing description that the described embodiment of the invention provides a very simple control system that requires only one oxygen or combustion condition sensor by which it is able to accurately measure the air volume in the remaining cylinders by measuring instantaneous crankshaft speed differences over a fixed incremental time.

Of course, the foregoing description is that of preferred embodiments of the invention, and various changes and modifications may be made without departing from the spirit and scope of the invention, as defined by the appended claims.

What is claimed is:

1. A control system for an internal combustion engine comprising a variable volume combustion chamber, an air/fuel charging system for delivering a fuel/air charge to said combustion chamber, an exhaust system discharging a burnt charge from said combustion chamber, an output shaft driven by the combustion in said engine, a combustion condition sensor for sensing the air/fuel ratio in said combustion chamber; a sensor for sensing the variations in speed of said output shaft at two points in less than one complete revolution of said output shaft, and feedback control means for varying the air/fuel ratio supplied by said air/fuel charging system to said combustion chamber in response to the output of said combustion condition sensor and modifying the control based upon the sensed speed variation by computing an air flow volume from the measured speed difference.

2. A control system as set forth in claim 1, wherein the output shaft speed is measured at two points during the compression stroke of the engine.

3. A control system as set forth in claim 1, wherein the combustion condition sensor comprises an exhaust sensor.

4. A control system as set forth in claim 3, wherein the output shaft speed is measured at two points during the compression stroke of the engine.

5. A control system as set forth in claim 1, wherein the engine is provided with a plurality of combustion chambers and the speed variation is measured for each of the combustion chambers.

6. A control system as set forth in claim 5, wherein there is only provided one combustion condition sensor associated with one of the combustion chambers.

7. A control system as set forth in claim 6, wherein the single combustion condition sensor is placed in a portion of the exhaust system associated only with that one combustion chamber.

8. A control system as set forth in claim 7, wherein the output shaft speed is measured at two points during the compression stroke of the engine.

9. A control system as set forth in claim 8, wherein the output shaft speed is measured before combustion is initiated.

10. A control system as set forth in claim 5, further including an exhaust control valve for controlling the back pressure in the exhaust system.

11. A control system as set forth in claim 5, wherein the flow of at least the air charge into the combustion chamber is controlled by an intake valve and the flow of exhaust charge from the combustion chamber is controlled by an exhaust valve and further including means for varying the tiring of the opening and/or closing of at least one of said valves.

12. A method of controlling an internal combustion engine comprising a variable volume combustion chamber, an air/fuel charging system for delivering a fuel/air charge to said combustion chamber, an exhaust system discharging a burnt charge from said combustion chamber, an output shaft driven by the combustion in said engine, said method comprising the steps of sensing the air/fuel ratio in said combustion chamber; sensing the variations in speed of said output shaft at two points in less than one complete revolution of said output shaft, and varying the air/fuel ratio supplied by said air/fuel charging system to said combustion chamber in response to the sensed air/fuel ratio and modifying the control based upon the sensed speed variation by computing an air flow volume from the measured speed difference.

13. A control method as set forth in claim 12, wherein the output shaft speed is measured at two points during the compression stroke of the engine.

14. A control method as set forth in claim 12, wherein the air/fuel ratio is sensed by an exhaust sensor.

15. A control method as set forth in claim 14, wherein the output shaft speed is measured at two points during the compression stroke of the engine.

16. A control method as set forth in claim 12, wherein the engine is provided with a plurality of combustion chambers and the speed variation is measured for each of the combustion chambers.

17. A control method as set forth in claim 16, wherein the air/fuel ratio of only one of the combustion chambers is measured.

18. A control method as set forth in claim 17, wherein the air/fuel ratio of only one of the combustion chambers is measured by a single sensor placed in a portion of the exhaust system associated only with that one combustion chamber.

19. A control method as set forth in claim 18, wherein the output shaft speed is measured at two points during the compression stroke of the engine.

20. A control method as set forth in claim 19, wherein the output shaft speed is measured before combustion is initiated.

* * * * *

UNITED STATES PATENT AND TRADEMARK OFFICE
CERTIFICATE OF CORRECTION

PATENT NO. : 5,791,314
DATED : August 11, 1998
INVENTOR(S) : Takeshi Ito

It is certified that error appears in the above-identified patent and that said Letters Patent is hereby corrected as shown below:

<u>Column 7,</u>
Line 9, please change "tiring of the" to -- timing of the --.

Signed and Sealed this

Twenty-seventh Day of August, 2002

Attest:

JAMES E. ROGAN
Attesting Officer  Director of the United States Patent and Trademark Office